(12) United States Patent
Kayhart

(10) Patent No.: US 7,832,159 B1
(45) Date of Patent: Nov. 16, 2010

(54) RADIANT IN-FLOOR HEATING SYSTEM

(76) Inventor: Paul H. Kayhart, N. 7439 Romadka, Loyal, WI (US) 54446

( * ) Notice: Subject to any disclaimer, the term of this patent is extended or adjusted under 35 U.S.C. 154(b) by 472 days.

(21) Appl. No.: 11/602,687

(22) Filed: Nov. 21, 2006

Related U.S. Application Data

(60) Provisional application No. 60/811,219, filed on Jun. 6, 2006.

(51) Int. Cl.
*E04C 2/52* (2006.01)
(52) U.S. Cl. .................... 52/220.3; 52/220.1; 52/220.2; 126/662; 165/171; 165/53
(58) Field of Classification Search ............... 52/220.1, 52/220.2, 220.3; 126/662; 165/171, 53
See application file for complete search history.

(56) References Cited

U.S. PATENT DOCUMENTS

| | | | | | |
|---|---|---|---|---|---|
| 866,770 | A | * | 9/1907 | Burk | 52/220.1 |
| 1,730,472 | A | * | 10/1929 | Murray | 264/259 |
| 1,765,460 | A | * | 6/1930 | Siebs | 52/220.1 |
| 1,845,760 | A | * | 2/1932 | Murray et al. | 52/220.3 |
| 2,469,963 | A | * | 5/1949 | Grosjean et al. | 165/56 |
| 2,559,198 | A | * | 7/1951 | Ogden | 165/136 |
| 2,594,232 | A | * | 4/1952 | Stockstill | 165/171 |
| 2,672,324 | A | * | 3/1954 | Weiss | 165/171 |
| 2,681,796 | A | * | 6/1954 | Rapp | 165/56 |
| 2,693,940 | A | * | 11/1954 | Preisinger | 165/171 |
| 2,721,471 | A | * | 10/1955 | Baker et al. | 52/381 |
| 2,732,615 | A | * | 1/1956 | Sandberg | 29/890.038 |
| 2,775,017 | A | * | 12/1956 | McDonough | 249/83 |
| 2,823,701 | A | * | 2/1958 | Burk | 138/103 |
| 2,950,575 | A | * | 8/1960 | Hellwig | 174/491 |
| 2,987,300 | A | * | 6/1961 | Greene | 165/169 |
| 3,037,746 | A | * | 6/1962 | Williams | 165/56 |
| 3,387,653 | A | * | 6/1968 | Coe | 165/165 |
| 3,421,577 | A | * | 1/1969 | Valyi | 165/170 |
| 3,503,165 | A | * | 3/1970 | Hardt | 52/125.5 |
| 3,827,485 | A | * | 8/1974 | Hickman et al. | 165/171 |

(Continued)

OTHER PUBLICATIONS

Radiant Heat Products LLC, Suspended Tube Radiant Heating System, shown at website www.radiantheatproducts.com/store.asp-?pid=5124 on Mar. 6, 2007 (2 pages).

(Continued)

*Primary Examiner*—Richard E Chilcot, Jr.
*Assistant Examiner*—Matthew J Gitlin
(74) *Attorney, Agent, or Firm*—Brannen Law Office, LLC

(57) ABSTRACT

The present invention relates to an in-floor radiant heating system having a tube that is received into low profile panels. Channels are formed in the top of the panels. The channels can have a neck shaped top section and a circular shaped bottom section. The bottom section has a diameter that is larger than the width of the top section. The diameter of the tubing is smaller than the diameter of the bottom section to ensure a snug fit. Flares can be located between the ends of the channels and the sides of the panel to allow the tube to bend and fit between adjacent panels that are offset up to a determined amount. A transition piece can be used to interface between a room with the in-floor system and one without. An installer can see the top of the tubing during the installation process.

8 Claims, 8 Drawing Sheets

U.S. PATENT DOCUMENTS

| | | | | |
|---|---|---|---|---|
| 3,987,599 | A * | 10/1976 | Hines | 52/591.1 |
| 4,000,850 | A * | 1/1977 | Diggs | 126/613 |
| 4,074,406 | A * | 2/1978 | Boyd et al. | 29/890.033 |
| 4,080,703 | A * | 3/1978 | Beck, Jr. | 29/890.038 |
| 4,165,592 | A * | 8/1979 | Blankenship | 174/483 |
| 4,245,620 | A * | 1/1981 | Heinemann | 126/662 |
| 4,250,674 | A * | 2/1981 | Feist | 52/220.3 |
| 4,326,366 | A * | 4/1982 | Werner | 52/220.3 |
| 4,338,995 | A * | 7/1982 | Shelley | 165/49 |
| 4,508,162 | A * | 4/1985 | Radtke | 165/56 |
| 4,538,527 | A * | 9/1985 | Kitchen | 109/21 |
| 4,646,814 | A | 3/1987 | Fennesz | |
| 4,763,727 | A * | 8/1988 | Kreuzer et al. | 165/171 |
| 4,766,951 | A * | 8/1988 | Bergh | 165/56 |
| 4,782,889 | A * | 11/1988 | Bourne | 165/56 |
| 4,865,120 | A * | 9/1989 | Shiroki | 165/56 |
| 4,878,332 | A * | 11/1989 | Drake | 52/745.05 |
| 4,968,855 | A * | 11/1990 | Le Paillier | 174/504 |
| 4,996,810 | A * | 3/1991 | Forde | 52/220.3 |
| 5,014,488 | A * | 5/1991 | Evangelos et al. | 52/746.12 |
| 5,131,458 | A * | 7/1992 | Bourne et al. | 165/56 |
| 5,327,737 | A * | 7/1994 | Eggemar | 62/66 |
| 5,454,428 | A * | 10/1995 | Pickard et al. | 165/49 |
| 5,479,707 | A * | 1/1996 | Alvarez et al. | 29/890.039 |
| 5,497,826 | A * | 3/1996 | Ingram | 165/56 |
| 5,509,246 | A * | 4/1996 | Roddy | 52/533 |
| 5,509,472 | A * | 4/1996 | Tamura et al. | 165/56 |
| 5,740,858 | A * | 4/1998 | Ingram | 165/56 |
| 5,743,330 | A * | 4/1998 | Bilotta et al. | 165/183 |
| 5,788,152 | A * | 8/1998 | Alsberg | 237/69 |
| 5,957,378 | A * | 9/1999 | Fiedrich | 237/69 |
| 6,076,315 | A * | 6/2000 | Kondo | 52/220.1 |
| 6,092,587 | A * | 7/2000 | Ingram | 165/56 |
| 6,152,377 | A * | 11/2000 | Fiedrich | 237/69 |
| 6,164,026 | A * | 12/2000 | Ehrenkrantz | 52/220.2 |
| 6,189,289 | B1 * | 2/2001 | Quaglia et al. | 52/764 |
| 6,220,523 | B1 * | 4/2001 | Fiedrich | 237/69 |
| 6,270,016 | B1 * | 8/2001 | Fiedrich | 237/69 |
| 6,283,382 | B1 | 9/2001 | Fitzemeyer | |
| 6,330,980 | B1 * | 12/2001 | Fiedrich | 237/69 |
| 6,526,710 | B1 * | 3/2003 | Killen | 52/220.1 |
| 6,533,185 | B1 * | 3/2003 | Muir | 237/69 |
| 6,621,983 | B2 * | 9/2003 | Thorin | 392/435 |
| 6,726,115 | B1 * | 4/2004 | Chiles et al. | 237/69 |
| 6,805,298 | B1 * | 10/2004 | Corbett | 237/69 |
| 6,926,077 | B2 * | 8/2005 | Kuga et al. | 165/170 |
| 7,010,893 | B2 * | 3/2006 | Bernhardt | 52/302.3 |
| 7,013,964 | B2 * | 3/2006 | Pays et al. | 165/168 |
| 7,021,372 | B2 * | 4/2006 | Pickard | 165/168 |
| 7,140,426 | B2 * | 11/2006 | Huebner et al. | 165/170 |
| 7,144,187 | B1 * | 12/2006 | Nolte et al. | 404/6 |
| 2003/0218075 | A1 | 11/2003 | Muir | |
| 2004/0026525 | A1 * | 2/2004 | Fiedrich | 237/69 |
| 2004/0031219 | A1 * | 2/2004 | Banister | 52/220.2 |
| 2004/0040693 | A1 * | 3/2004 | Fiedrich | 165/56 |
| 2004/0072454 | A1 * | 4/2004 | Nakajima et al. | 439/79 |
| 2005/0028966 | A1 * | 2/2005 | Pickard | 165/168 |
| 2006/0144578 | A1 | 7/2006 | Fiedrich | |
| 2007/0135878 | A1 * | 6/2007 | Lachenbruch et al. | 607/108 |
| 2007/0276437 | A1 * | 11/2007 | Call et al. | 606/232 |

OTHER PUBLICATIONS

Warmboard, Inc., Radiant Subfloor, shown at website www.warmboard.com/explainded.html on Mar. 6, 2007 (4 pages, inlcuding page printout and zoomed in view of selected image).

* cited by examiner

RADIANT IN-FLOOR HEATING SYSTEM

This application claims priority on US Provisional Application having application No. 60/811,219, filed on Jun. 6, 2006, the entire disclosure of which is hereby incorporated herein by reference.

BACKGROUND OF THE INVENTION

1. Field of the Invention

The present invention relates to an in-floor radiant heating system having channels for receiving tubing wherein flares are provided at the ends of the channels to provide a channel alignment tolerance between the respective channels of adjacent panels.

2. Description of the Related Art

One common home heating method includes the use of forced-air furnaces. While these systems work well for their intended purposes, their use is not without some limitations. Forced-air systems work by distributing heated air into desired rooms. The heat has a tendency to quickly rise towards the ceiling, which is inefficient. Rooms, particularly those with tile or slate flooring, may feel cold. Rooms with hard wood flooring may also feel cold. Homeowners and occupants may have reduced enjoyment of rooms with these types of flooring during the winter months when their home is heated with a forced air system.

In contrast, many homes can be constructed with radiant in-floor heating. Benefits of the in-floor heating in the winter months are well known, and include the comfortable use and enjoyment of rooms with natural flooring or other types of solid flooring. This is traditionally accomplished by locating tubing in the floor when pouring the concrete sub-floor. One drawback of this type of installation is that any punctures or leaks in the tubing can be difficult and costly to fix. Also, this type of installation is only practical for a new construction. It is not practical to install this type of system when remodeling a home. Several inches of concrete may be necessary, and the room may not be able to accommodate the required thickness of the concrete. Also, use of several inches of concrete is impractical for use in all levels but the bottom level of a home due to the weight of the concrete. A further drawback of recessing the tubing in concrete is the built-in inefficiency of allowing some heat pass to the ground below the concrete. This is due to the lack of insulation below the concrete.

A product having the name Warmboard exists utilizing panel type sub-flooring. One drawback with this type of panel is that the channels for receiving the heating tubes have generally vertical side walls. The heating tubes are simply placed within the channels. Caulk or another type of adhesive is necessary to hold the tubes in place. It can be difficult to remove adhesively secured tubes if they are in need of repair or replacement.

Another system in use utilizes a tube mounted to the underside of a sub-floor between the joists. Insulation is then placed below the tube and between the joists so that the heat dissipated from the tube rises through the sub-floor instead of into the room below. It is impractical to install this type of system during a remodeling job when the room below the room where the heating system is being installed is a finished room. This is because the finished ceiling will impair access to the joists.

U.S. Pat. No. 4,326,366 to Werner is entitled Support Plate for Guiding Heating Pipes of a Floor or Wall Heating System. Looking particularly to FIG. 3 of the Werner patent, it is seen that this patent discloses a heat conducting layer, and a recess that forms part of a circle.

U.S. Pat. No. 4,646,814 to Fennesz discloses a system for tempering a room. This system has duct for allowing air to pass through the system.

U.S. Pat. No. 5,788,152 to Alsberg shows a floor heating system. The system has panels overlaid with a heat conducting surface embossed with a matching groove pattern. The panels have structural characteristics of a subflooring panel. FIG. 3 shows a modular panel.

U.S. Pat. No. 5,957,378 to Fiedrich is entitled Radiant Floor and Wall Hydronic Heating Systems. This patent shows a plate for holding a tube in intimate thermal contact so that the plate is heated by conduction. The plate has a radiating surface that radiates the heat to an area. U.S. Pat. No. 6,220,523 also to Fiedrich is entitled For Radiant Floor, Wall and Ceiling Hydronic Heating and/or Cooling Systems Using Metal Plates that are Heated or Cooled by Attached Tubing that is Fed Hot or Cold Water, Techniques of Improving Performance and Avoiding Condensation when Cooling. A thermal barrier is provided between the panels and the finished floor to prevent "hot spots". U.S. Pat. No. 6,330,980 further to Fiedrich in entitled Dry Installation of a Radiant Floor or Wall Hydronic Heating System, Metal Radiating Plates that Attach to the Edges of Side-By-Side Boards and Provide Metal Slots for Holding Hot Water Tubing. The metal plate is shown to be in two separate pieces that are attached to edges of spaced apart boards. The metal plates combine to hold the tubing.

U.S. Pat. No. 6,283,382 to Fitzemeyer shows a radiant heating system pipe mounting plate. The plate is disclosed to be a flat sheet with a groove in the upper surface. A pipe is retained in the groove by a ridge running the length of the groove so that the pipe can be snapped into the groove. A top is also shown for making a flat surface.

U.S. Pat. No. 6,533,185 and pending application with publication number 2003/0218075 to Muir shows a thermal heating board comprising a nonstructural board with a recess. A pipe can be located within the recess. A film or metal can also be provided.

U.S. Pat. No. 6,805,298 to Corbett, entitled Modular Cementitous Thermal Panels for Radiant Heating, shows panels made of Portland cement or other curable cement.

U.S. Pat. No. 7,021,372 to Pickard shows a heat tubing receptacle for tightly gripping the heat tubing. Sheet metal heat transfer plates may be attached to the tubing receptacle.

Pending application with publication number 2004/0040693 to Fiedrich shows forming a metal sheet in a unitary fashion by folding it longitudinally to provide protuberances of double thickness for holding tubing. Pending application with publication number 2006/0144578 also to Fiedrich shows modular panels having special purpose bus tracks for routing tubing.

A drawback of using panels generally has been the small allowable tolerance between adjacent panels. Said another way, the channels must align within a very little margin of error in order for the channels to receive the tubing. The panels typically have channels with constant dimensions throughout their respective lengths. The respective ends of channels of adjacent panels therefore have to be aligned properly in order for the tubing to be placed within the channels.

In practice, the installers lay out the panels, place the tubing in the desired channels, and then fasten the panels to the sub-floor. Using adhesives to connect the panels to the sub-floor becomes quite difficult if the tubing is inserted into the channels before the panels are fixed to the sub-floor. The use of adhesive is therefore impractical when installing the panels in this manner, even-though adhesives may be more advantageous than nails in some circumstances. Further, it is possible that relatively large amounts of stress could be placed on the tubing at the interface between adjacent panels as adjacent panels shift. This sheer stress can damage the tubing.

Thus there exists a need for an in-floor heating system that solves these and other problems.

SUMMARY OF THE INVENTION

The present invention relates to an in-floor radiant heating system having channels for receiving tubing wherein flares are provided at the ends of the channels to provide a channel alignment tolerance between the respective channels of adjacent panels.

According to the present invention, the base boards can be low profile panels having a top and a bottom. Channels can be formed in the top of the panels at predetermined locations for selective tube placement by the installer. The channels can have a top section and a bottom section. The bottom section can, in a preferred embodiment, have a generally circular shaped perimeter with a diameter that is larger than the width of the top section. Tubing can be snap fit into the channel bottom section. In this regard, the diameter of the tubing is slightly smaller than or nearly identical to the diameter of the bottom section to ensure a snug fit. Flares are provided at the channel ends. The flares are divergent laterally in both directions and vertically towards the bottom of the panel relative to the longitudinal axis of the flare. The vertical flare extends completely through the panel in one embodiment.

Advantageously, the panels can be low profile panels. In a preferred embodiment, the panels are approximately 0.75 inches thick. Also, the panels are lightweight. In this regard, the present invention is well suited for both new construction and remodeling installations. The panels can be installed into rooms with standard height ceilings. A transition piece can easily be installed at the interface between a room with the in-floor system and one without the in-floor system. The panels can also be used upstairs, such as in a bathroom having tile floors, as the weight of the panels is not prohibitive.

Another advantage of the present invention is that the tubing can snap into place within the panels. This is easily accomplished with the use of a rubber mallet or another suitable tool. The tubes can accordingly be snuggly held in place without the need for adhesives. Further, the tubes can be easily removed from the channels for repair or replacement.

A further advantage of the present invention is that an installer can see the top of the tubing during the installation process. Advantageously, the installer can then avoid the tubing when nails or the like are required to hold the flooring in place on the panels.

A still further advantage yet of the present invention is that the overall height of the installation is minimized. This is accomplished in part by elimination of an additional layer of material being installed over the panels and tubes.

A still further advantage yet of the present invention is that the system can be installed in any room regardless of whether the room below is finished.

A still further advantage yet of the present invention is that flares are located at the ends of the channels. The flares diverge left, right and vertically downward relative the longitudinal axis as the flare extends to the side of the panel. The vertical flare extends completely through the panel. The channels for receiving the tube terminate at the beginning of the flare, as the tubing is no longer restrained in the channel. The tubing is unrestrained in lateral movement in the flare, and is unrestrained vertically in one direction. Advantageously, the location of the panels can be held to a less strict tolerance during installation. The tubing is able to overcome a maximum offset amount between two panels without incurring undesirable sheer stress on the tube.

Other advantages, benefits, and features of the present invention will become apparent to those skilled in the art upon reading the detailed description of the invention and studying the drawings.

DETAILED DESCRIPTION OF THE PREFERRED EMBODIMENTS

Figure 1:
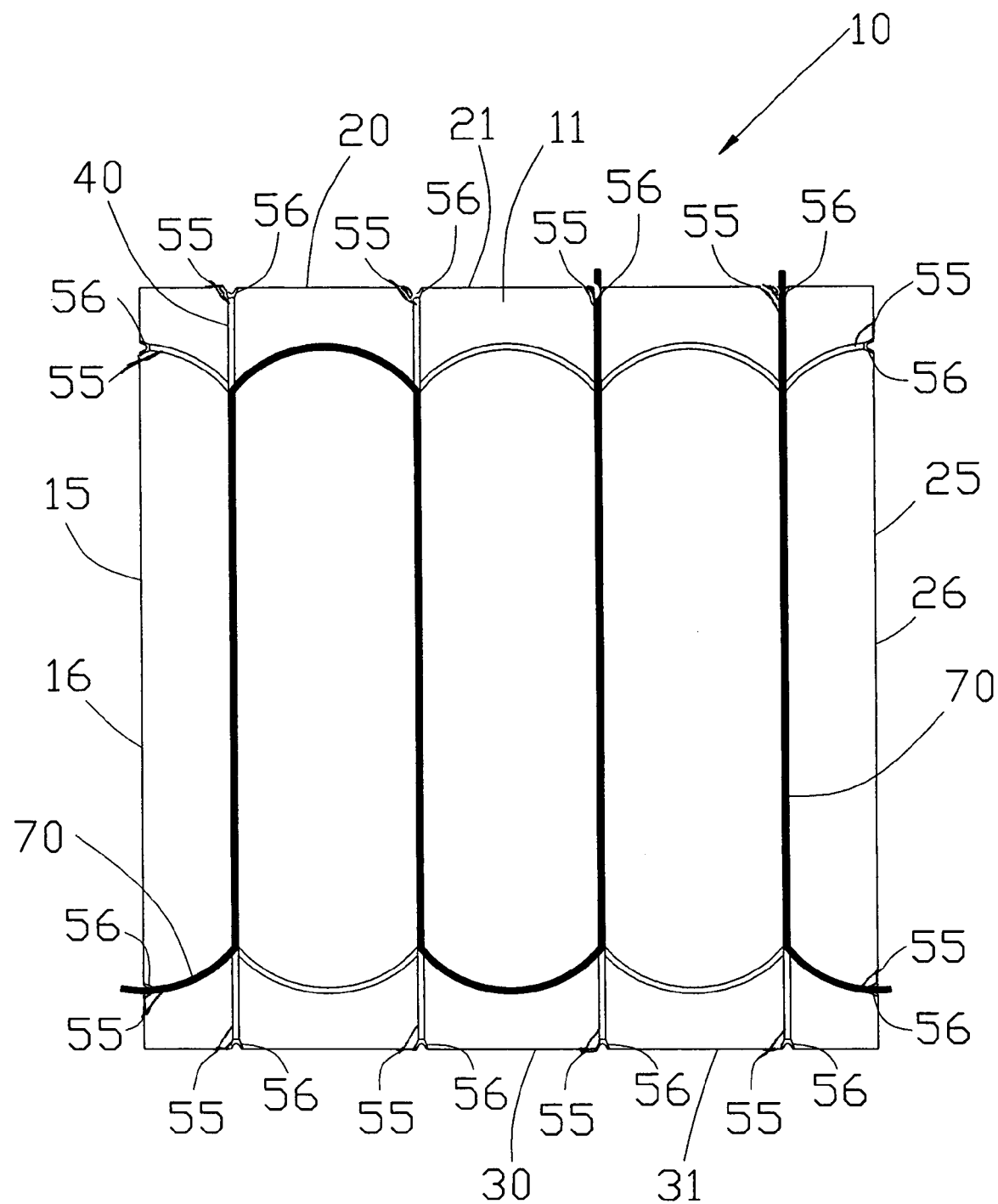
FIG. 1 is a top view of a preferred modular panel.

While the invention will be described in connection with several preferred embodiments, it will be understood that it is not intended to limit the invention to those embodiments. On the contrary, it is intended to cover all alternatives, modifications and equivalents as may be included within the spirit and scope of the invention as defined by the appended claims.

A preferred embodiment of the present invention comprises one or more panels 10 having one or more channels 40 formed therein. Tubing 70 can be inserted in the channels 40. Liquid 80 can be heated and pumped through the tubes 70 with a suitable heat pump.

Panels 10 are preferably comprised of a wooden board, such as particle board. One desirable quality of particle board is its insulative qualities. It is understood that other materials can be used without departing from the broad aspects of the present invention. Preferred dimensions of the panels are 4 feet in length and width. The panels are low profile panels and have a depth of approximately ¾ inch. These dimensions have been found to be easy to handle. It is understood that other dimensions could be utilized without departing from the broad aspects of the present invention. The panels 10 each have a top 11 and a bottom 12. A first side 15 is provided and at least the majority of which lies in a plane 16. A second side 20 is provided and at least the majority of which lies in a plane 21. A third side 25 is provided and at least the majority of which lies in a plane 26. A fourth side 30 is provides and at least the majority of which lies in plane 31. The first and third sides 15 and 25 are preferably parallel. The second and fourth sides 20 and 30 are preferably parallel to each other, and perpendicular to sides 15 and 25. The panels 10 are not considered to be structural flooring. In this regard, each panel 10 can be secured in place on top of the structural flooring 1, or sub-floor. Suitable structural sub-flooring 1 can include concrete, plywood or any other approved structural sub-flooring. The panels 10 can be secured in place with nails, screws, adhesive material or any other suitable means.

Figure 2:
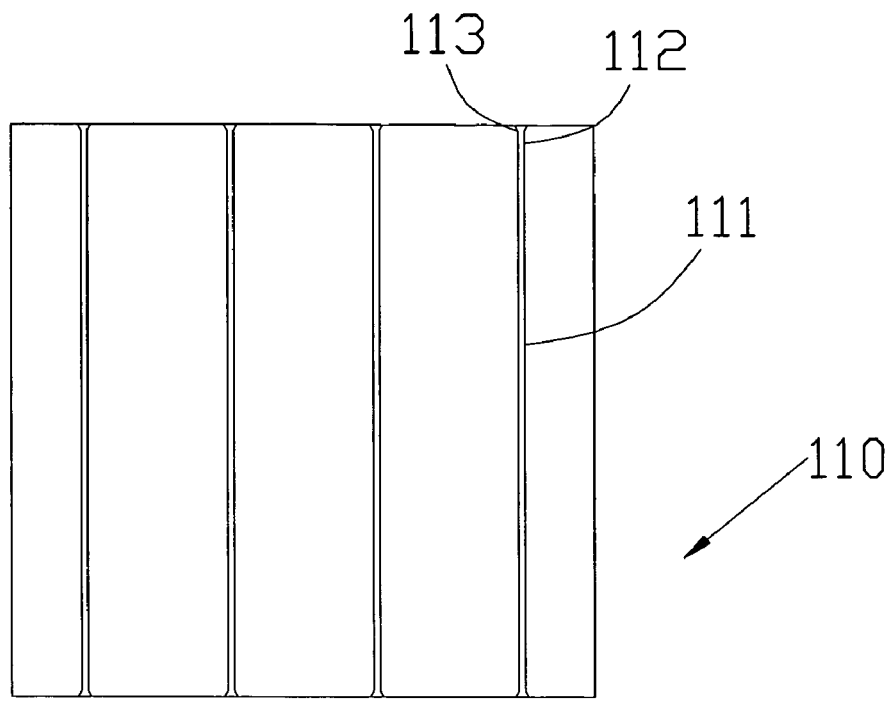
FIG. 2 is a top view of an alternative preferred modular panel.
Figure 3:
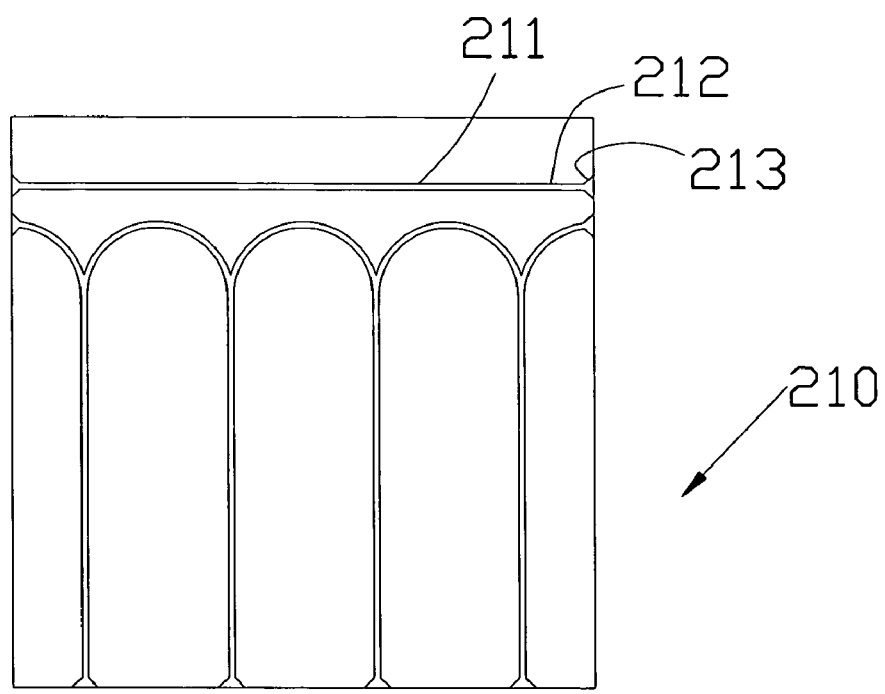
FIG. 3 is a top view of an additional alternative preferred modular panel.

Several channels 40 are formed in each panel 10. The channels 40 can form tracks through the panels 10. A preferred channel layout is shown in FIG. 1. An alternative channel layout is shown in FIG. 2. Another alternative channel layout is shown in FIG. 3. It is understood that panels of other configurations (not shown) can be used without departing from the broad aspects of the present invention.

Each channel 40 has a top section 45. The top section 45 is preferably neck shaped, and has sides 46 and 47. The sides 46 and 47 are preferably parallel to each other, and are preferably perpendicular to the top 11 of the panel. The top section 45 preferably has a width of approximately 0.605 inches. Each channel 40 also has a bottom section 50. The bottom section 50 has a wall 51 that is preferably generally circular shaped. A preferred diameter of the wall 51 is approximately 0.625 inches. In this regard, the diameter of the bottom section 50 is larger than the width of the top section 45. It is understood that the exact dimensions of the top section 45 and bottom section 50 can vary. Each channel 40 has ends 55. The channel 40 retains tubing 70 (described below), and restricts movement of the tubing.

It is understood that in an alternative embodiment, the channel can have a top with parallel sidewalls, and a bottom section with a semicircular shaped wall wherein the diameter of the wall of the bottom section is equal to the distance between the sidewalls of the top section.

A flare 56 is at the end of each channel 40. The flare 56 has a first sidewall 57, a second sidewall 58 and a depending drop-off wall 59. The flare 56 and end 55 of the channel 40 have a concentric and equal longitudinal axis 60. The longitudinal axis 60 is generally perpendicular to the respective side of the panel 10. It is appreciated that the channel 40, which function is to retain the tubing, terminates interior of the side of the panel 10. The flare 56 is located between the end 55 of the channel 40 and the respective panel side. The flare 56 does not retain the tubing. Rather, the tubing 70 is able to move within the flare 56. The depending drop-off wall 59 preferably passes entirely through the panel 10 interior of the side of the panel.

Figure 4:
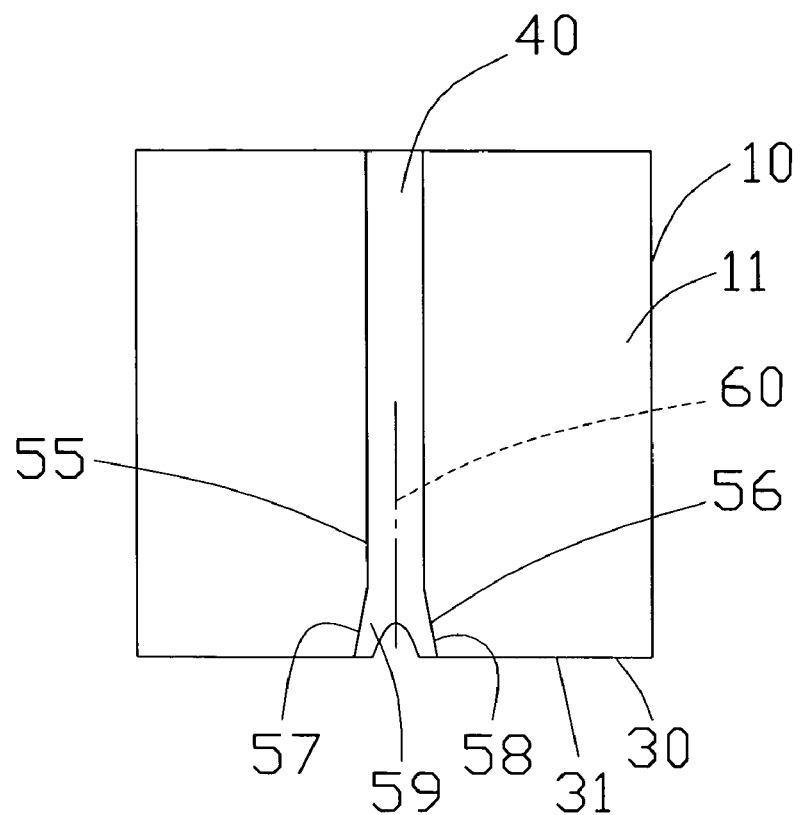
FIG. 4 is top view of a preferred end of a channel.
Figure 6:
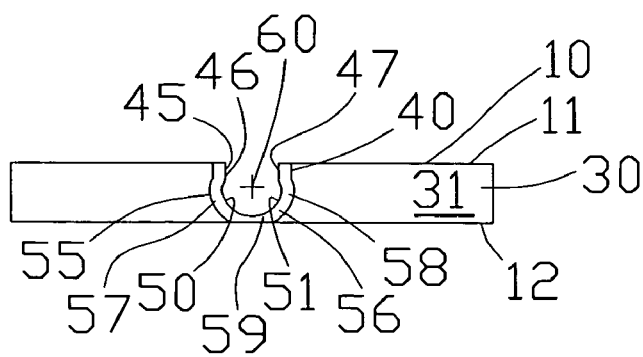
FIG. 6 is an end view of the preferred channel shown in FIG. 4.
Figure 8:
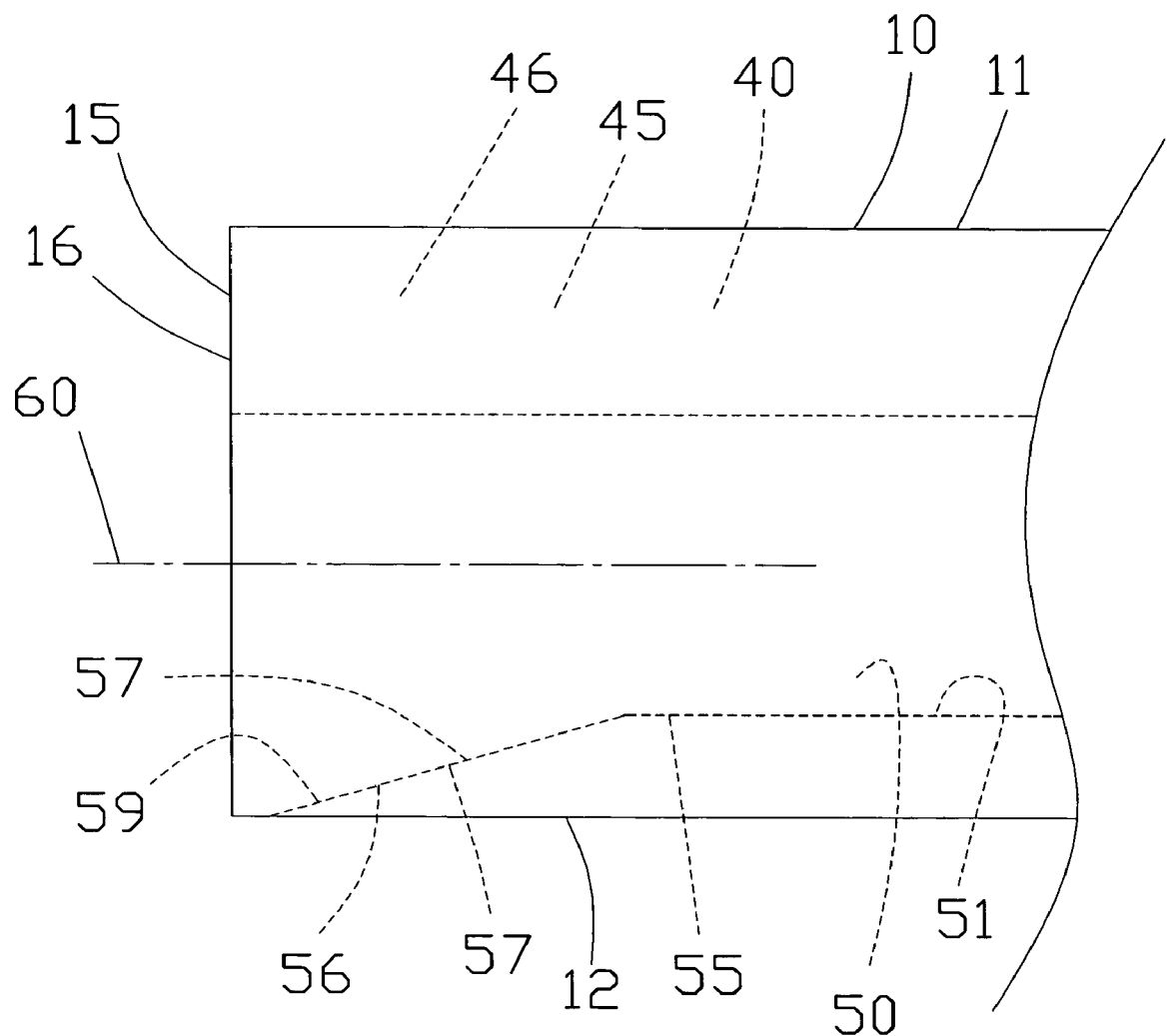
FIG. 8 is a side view of the end of the channel shown in FIG. 4.

Looking now to FIG. 4, a top view of an end 55 and flare 56 is shown. It is seen that the first side wall 57 and the second sidewall 58 are divergent from the longitudinal axis 60. In this regard, the flare 56 is wider at the side of the panel 10 than it is adjacent the end 55 of the channel 40. Looking now to FIGS. 6 and 8, a side view of the flare 56 is shown. It is seen that the drop-off wall 59 depends from the channel 40. The drop-off wall 59 opens to the bottom 12 of the panel 10 interior of the panel side 15. The first and second sidewalls 57 and 58 are also shown in FIG. 6. The flare 56 is preferably divergent in a linear manner. Yet, it is understood that the path of divergence of the first and second walls and the drop-off walls can be curvilinear without departing from the broad aspects of the present invention.

Figure 5A:
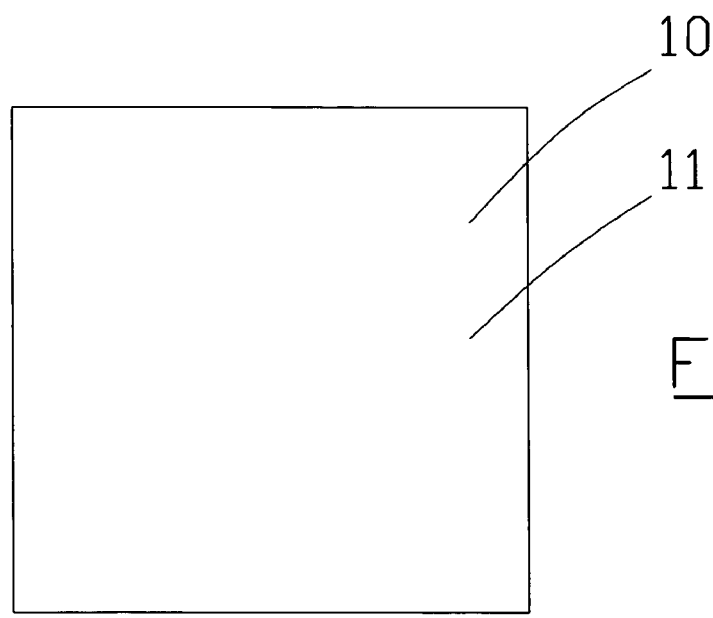
FIGS. 5A-5E sequentially show the process of forming the end of the channel shown in FIG. 4.
Figure 5B:
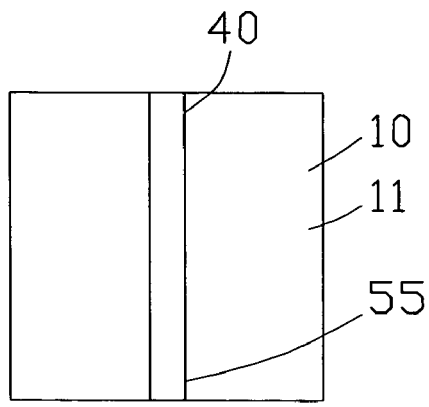
Figure 5C:
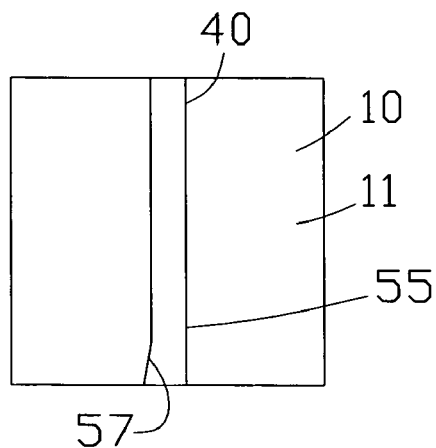
Figure 5D:
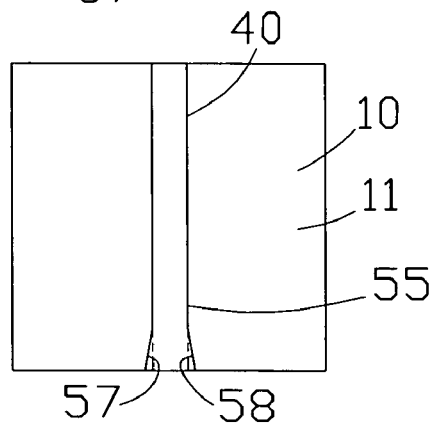
Figure 5E:
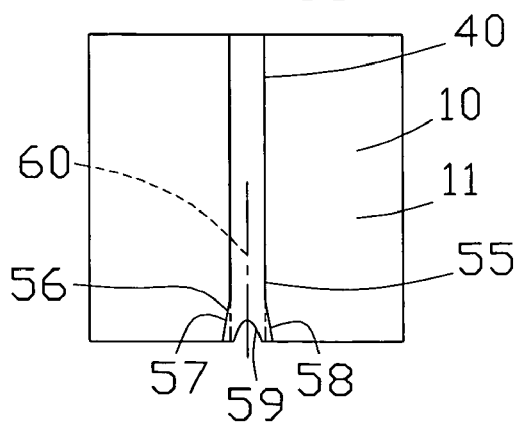
Figure 7A:
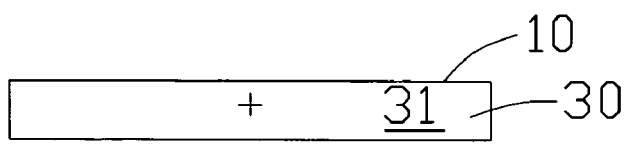
FIGS. 7A-7E sequentially show the process of forming the end of the channel shown in FIG. 5.
Figure 7B:
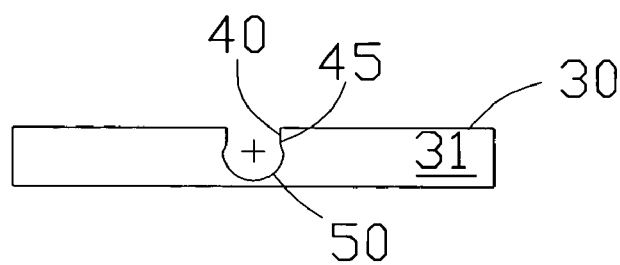
Figure 7C:
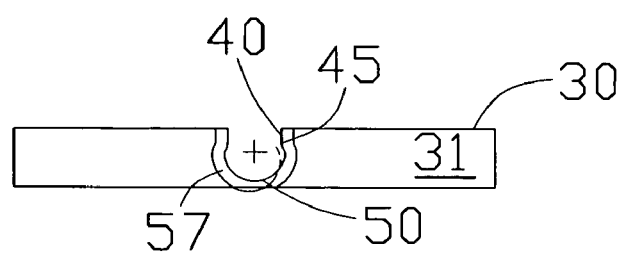
Figure 7D:
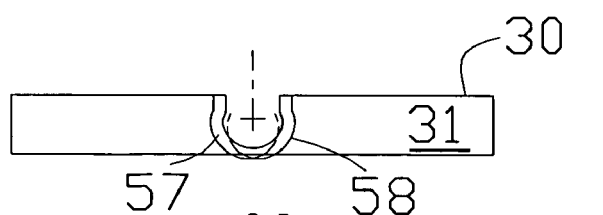
Figure 7E:
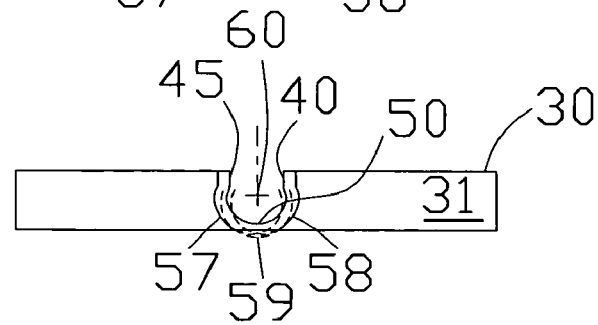

Looking now to FIGS. 5A-5E, a top view of the process of forming the flare 56 is provided. Looking at FIGS. 7A-7E, an end view of the process of forming the flare 56 is provided. First, the channel 40 is cut. This cut is extended to the side of the panel 10 as shown in FIGS. 5B and 7B. Next, the first divergent wall 57 is cut, as shown in FIGS. 5C and 7C. Next, the second divergent wall 58 is cut, as shown in FIGS. 5D and 7D. Lastly, the drop-off wall is cut, as shown in FIGS. 5E and 7E.

Looking now again at FIG. 1, it is seen that the sides 15, 20, 25 and 30 of the panel 10 do not have uniform dimensions. The majority of the length of these sides lie in planes 16, 21, 26 and 31, respectively. Yet, at each flare 56, the side wall has an inlet reaching to where the drop-off wall 59 intersects the bottom 12 of the panel.

Looking again at FIG. 2, it is seen that panel 110 has several channels 111 with respective ends 112. Flares 113 are provided adjacent the ends 112 of the channels 110 and intermediate the channels 111 and the respective sides of the panel 110. Looking now to FIG. 3, it is seen that panel 210 has several channels 211. The channels 111 have ends 212. Flares 213 are provided adjacent the ends 212 of the channels 210 and intermediate the channels 211 and respective sides of the panel 210.

Tubing 70 is also provided according to the present invention. The tube 70 has an inside 71 and an outside 72. The outside 72 of the tube 70 has a top 73 and a bottom 74. The tube 70 can be made of a material suitable for being used in an in-floor radiant heating system. The outside diameter of the tube is preferably approximately 0.625 inches. The tube 70 will snuggly fit and be releasably retained within the channel 40. The top 73 of the tube 70 is preferably flush with the top 11 of the panel 10 when the tube is installed. More than ½ of the tube 70 is preferably in direct contact with the channel 40. The top section 44 of the channel is narrower than the diameter of the tube 70. This secures the tube 70 in place within the channel 40 without the need for adhesives.

Any suitable liquid 80, such as water or oil, can be used with this system. A heat pump can be used to heat and force the liquid 80 through the tube.

Figure 12:
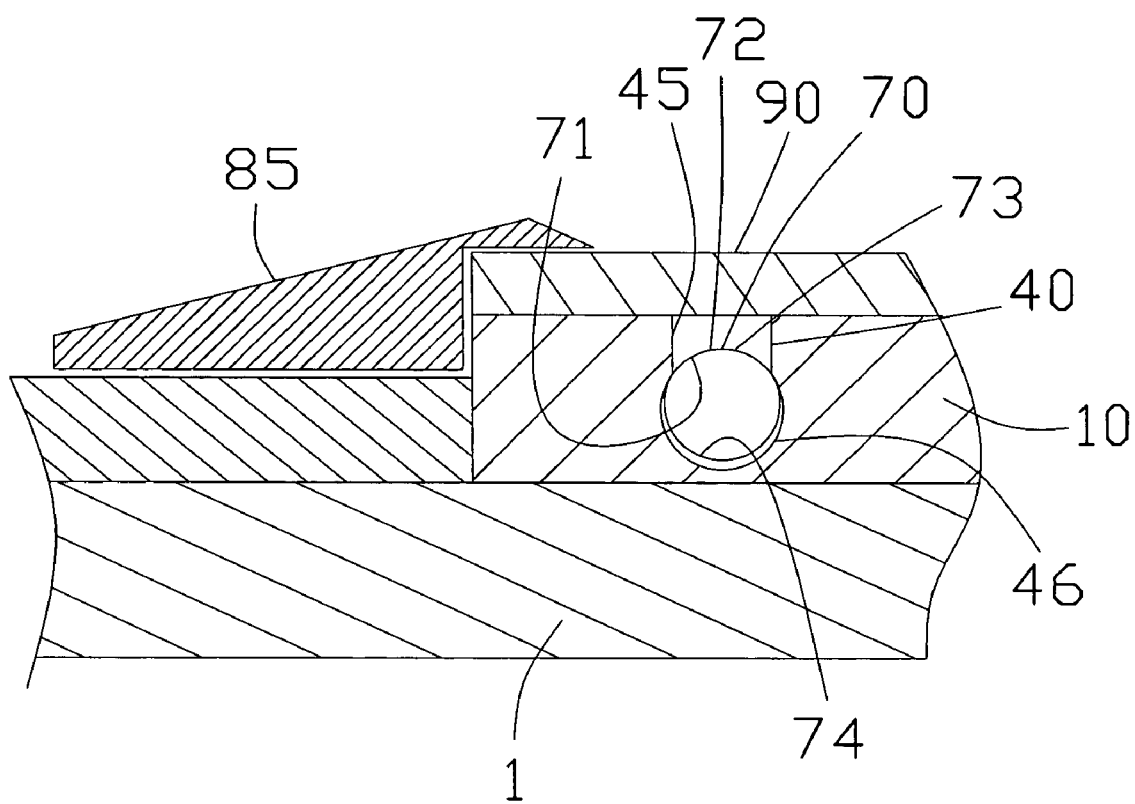
FIG. 12 is a sectional view showing tubing in place in the panel in an intended environment.

Turning now to FIG. 12, a transition piece 85 can be used to eliminate a tripping hazard between rooms with panels 10 and rooms that do not have panels 10. The transition piece 85 is preferably connected to the floor 90, and is designed to take up the approximate 0.75 inches height difference between the adjacent rooms due to the panels 40.

It is understood that an additional layer of material (not shown) having low heat conductivity can be placed between the sub-floor 1 and the panels 10 to maximize the heat that is transferred upward from the tubing 70 to the floor 90.

Turning now to the installation of the present invention, the panels 10 are first secured to the sub-floor 1. The panels 10 can be fixed with adhesive, nails, screws or any other suitable means. The preferred track for the tubing 70 is then determined, and the tubing 70 is placed into the appropriate channels 40. The flooring 90 can then be applied over the panels 40 in a manner where the tubes 70 are visible to the installer during the installation of the flooring 90.

Figure 9:
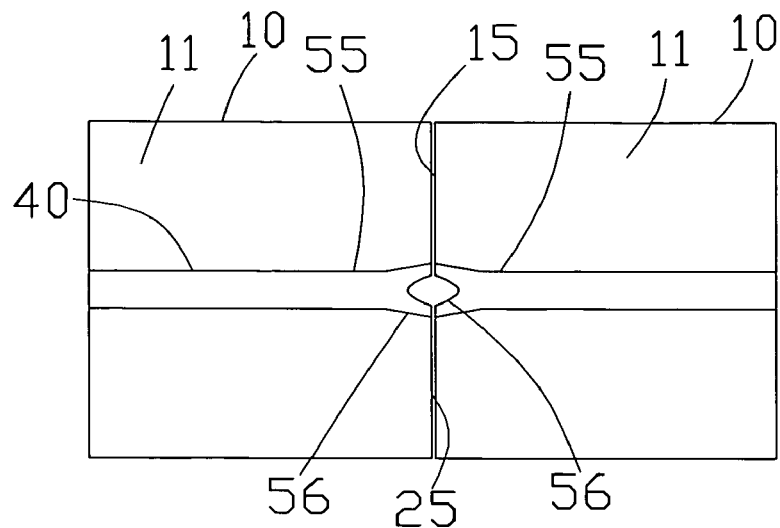
FIG. 9 is a top view of the respective ends of channels of two adjacent panels shown in alignment.
Figure 10:
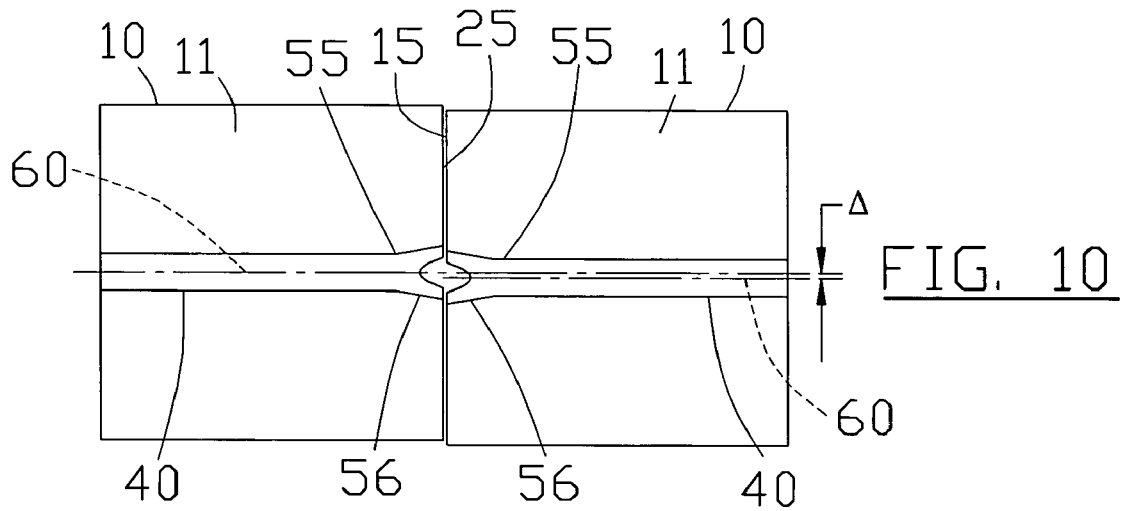
FIG. 10 is a top view of the respective ends of channels of two adjacent panels shown in offset alignment.
Figure 11:
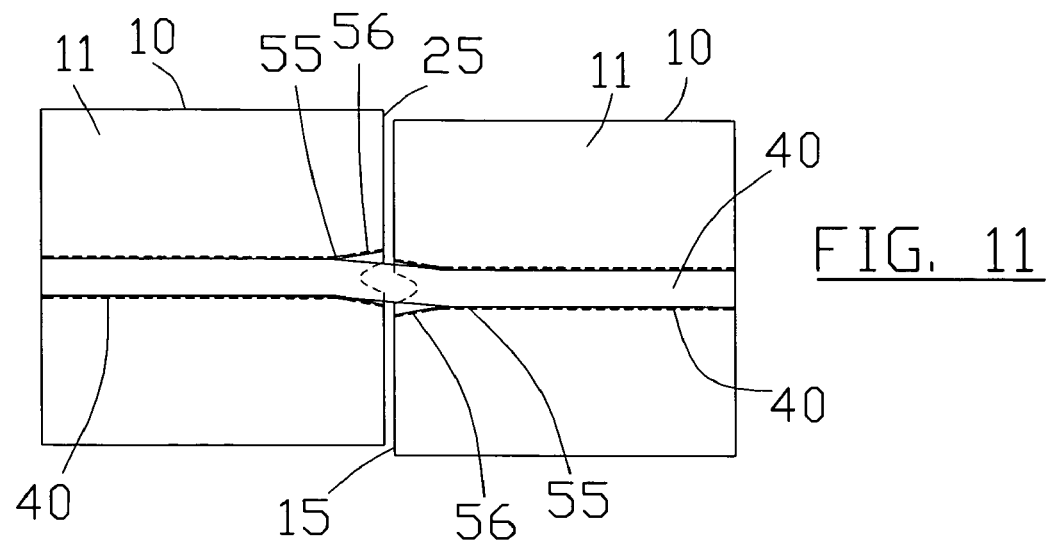
FIG. 11 is a top view of a tube bending to fit into the channels of offset adjacent panels.

Looking now at FIGS. 9-11, two panels 10 are shown in a side-by-side manner. In FIG. 9, the channels 40 of two panels 10, respectively, are shown in perfect alignment. A tube 70 would have no problem being received within the respective channels 40. FIG. 10 shows two panels in offset alignment. An installer would not be able to insert a tube into the channels except for the flares. The two panels are offset by an amount equal to delta. The flare 56, as shown in FIG. 11, allow the user to nevertheless install the tubes into the channels 40 of respective adjacent panels 10. The tubing 70 pass through the flares 56, respectively, where it is unrestrained and allowed to bend to overcome the offset alignment of the panels. It is appreciated that vertical offset amounts are also able to be overcome with the present invention.

Thus it is apparent that there has been provided, in accordance with the invention, an radiant in-floor heating system that fully satisfies the objects, aims and advantages as set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

I claim:

1. A modular panel for receiving a tube for dissipating heat, said modular panel being comprised of unitary construction and further comprising:
   a panel top, a panel bottom and four sides, said panel top defining a panel top plane and said panel bottom being continuously planar;
   at least one channel cut into said panel top and accessible and viewable via said panel top along the entire length of said at least one channel, said at least one channel having at least one end terminating interior of one of said four sides; and
   at least one flare between said at least one end of said at least one channel and said respective side of said modular panel, said at least one flare intersecting said panel bottom,
   wherein a tube is positionable and viewable within said channel via said panel top and retained in said channel, whereby the entire tube is below said panel top plane when installed into said channel and is unrestrained by a selected amount in said flare to allow for bending of the tube during installation of the tube into said channel; and
   whereby a selected amount of primary flooring can be placed directly on said panel top and the tube is viewable by an installer during placement of the selected amount of primary flooring.

2. The modular panel of claim 1 wherein said at least one flare has a longitudinal axis, and said at least one flare is a diverging flare widening as said flare approaches said one of said four sides.

3. The modular panel of claim 2 wherein said at least one flare is a linearly diverging flare.

4. The modular panel of claim 2 wherein said at least one flare further comprises a drop-off wall that depends from said longitudinal axis.

5. The modular panel of claim 4 wherein said drop-off wall intersects said panel bottom interior of the respective one of said four sides, wherein the profile of said respective one of said four sides is non-uniform.

6. The modular panel of claim 1 wherein:
   said at least one channel has a first end terminating interior of one of said four sides of said modular panel and a second end terminating interior of one of said four sides of said modular panel; and
   said modular panel comprises a first flare intermediate said first end and said one of said four sides and a second flare intermediate said second end and said one of said four sides.

7. The modular panel of claim 6 wherein said first flare and said second flare are on different ones of said four sides of said modular panel.

8. The modular panel of claim 1 wherein said at least one channel comprises a top section with parallel walls and a bottom section with a generally round sidewall, the diameter of said generally round sidewall of said bottom section being greater than the width between said parallel walls of said top section,
   wherein a tube can be forcefully inserted through said top section and releasably retained in said bottom section without an adhesive.

* * * * *